United States Patent
Keränen et al.

(10) Patent No.: US 9,986,412 B2
(45) Date of Patent: May 29, 2018

(54) DISCOVERY IN A WIRELESS COMMUNICATIONS SYSTEM

(71) Applicant: Telefonaktiebolaget LM Ericsson (publ), Stockholm (SE)

(72) Inventors: Ari Keränen, Helsinki (FI); Jari Arkko, Kauniainen (FI); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/318,231

(22) PCT Filed: Jun. 24, 2014

(86) PCT No.: PCT/SE2014/050776
§ 371 (c)(1),
(2) Date: Dec. 12, 2016

(87) PCT Pub. No.: WO2015/199587
PCT Pub. Date: Dec. 30, 2015

(65) Prior Publication Data
US 2017/0134925 A1    May 11, 2017

(51) Int. Cl.
*H04B 7/00*    (2006.01)
*H04W 8/00*    (2009.01)
*H04W 48/14*    (2009.01)
*H04W 52/02*    (2009.01)

(52) U.S. Cl.
CPC ........... *H04W 8/005* (2013.01); *H04W 48/14* (2013.01); *H04W 52/0209* (2013.01)

(58) Field of Classification Search
CPC .. H04W 48/14; H04W 52/0209; H04W 8/005
See application file for complete search history.

(56) References Cited

U.S. PATENT DOCUMENTS

| | | |
|---|---|---|
| 2009/0323647 A1 | 12/2009 | Park et al. |
| 2010/0254308 A1 | 10/2010 | Laroia et al. |
| 2013/0148642 A1 | 6/2013 | Abraham et al. |
| 2014/0112229 A1* | 4/2014 | Merlin ............. H04W 52/0209 370/311 |

(Continued)

FOREIGN PATENT DOCUMENTS

| | | |
|---|---|---|
| EP | 2 665 297 A1 | 11/2013 |
| WO | WO 01/01717 A1 | 1/2001 |

OTHER PUBLICATIONS

Supplementary European Search Report, EP Application No. 14895946, dated Apr. 28, 2017, 3 pages.

(Continued)

*Primary Examiner* — Xin Jia
(74) *Attorney, Agent, or Firm* — Sage Patent Group

(57) ABSTRACT

There is provided discovery in a wireless communications network. A communications device wirelessly receives, using a short-range communications technology, at least one beacon signal from at least one wireless device in the wireless communications network. The communications device wirelessly transmits, using the short-range communications technology, information relating to the received at least one beacon signal in at least one message such as to allow for discovery of the wireless device.

27 Claims, 4 Drawing Sheets

(56) References Cited

U.S. PATENT DOCUMENTS

| | | | |
|---|---|---|---|
| 2014/0204933 A1* | 7/2014 | Roy .................... | H04W 8/005 370/338 |
| 2015/0092678 A1* | 4/2015 | Narasimha ............ | H04W 8/005 370/329 |
| 2016/0014825 A1* | 1/2016 | Kim .................... | H04W 8/005 370/329 |
| 2016/0142496 A1* | 5/2016 | Wang ................ | H04W 52/0212 709/217 |

OTHER PUBLICATIONS

International Search Report and Written Opinion of the International Searching Authority, International Application No. PCT/SE2014/050776, dated Feb. 10, 2015.

* cited by examiner

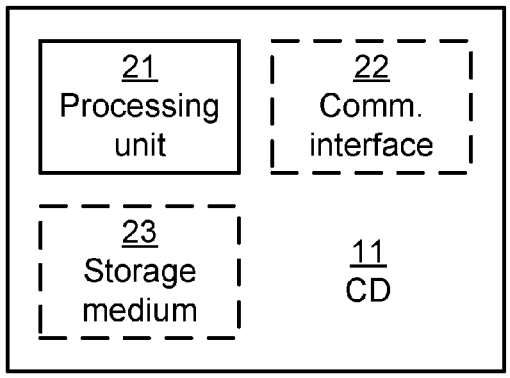
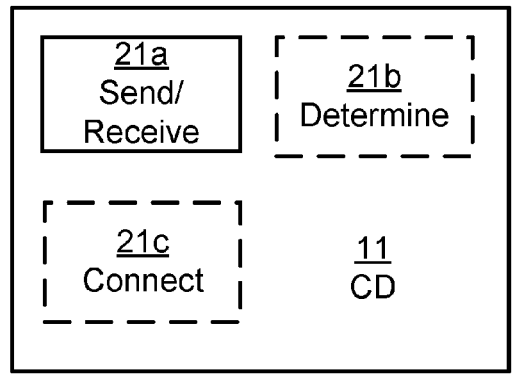
Fig. 2a                Fig. 2b
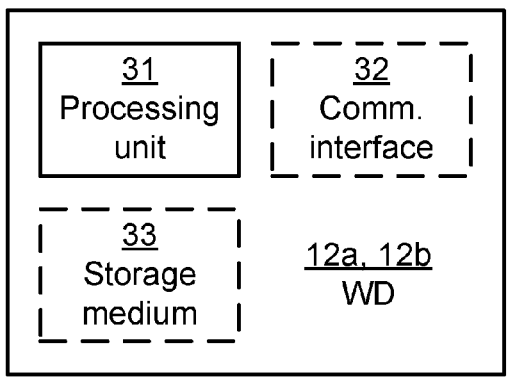
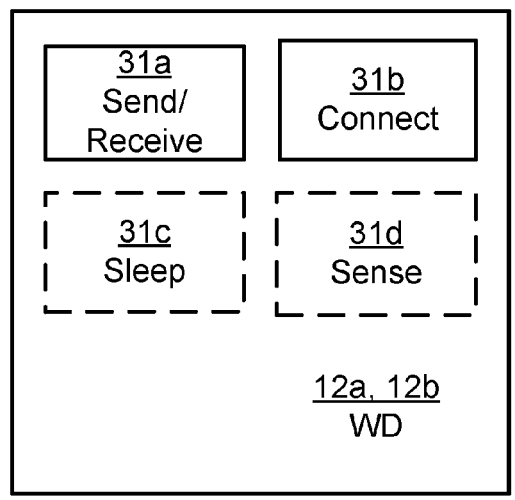
Fig. 3a                Fig. 3b

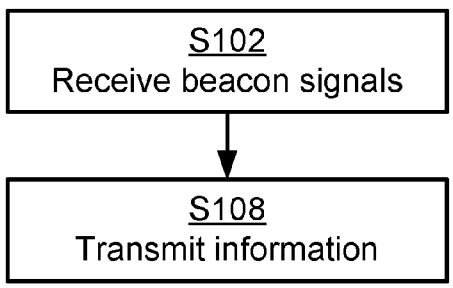
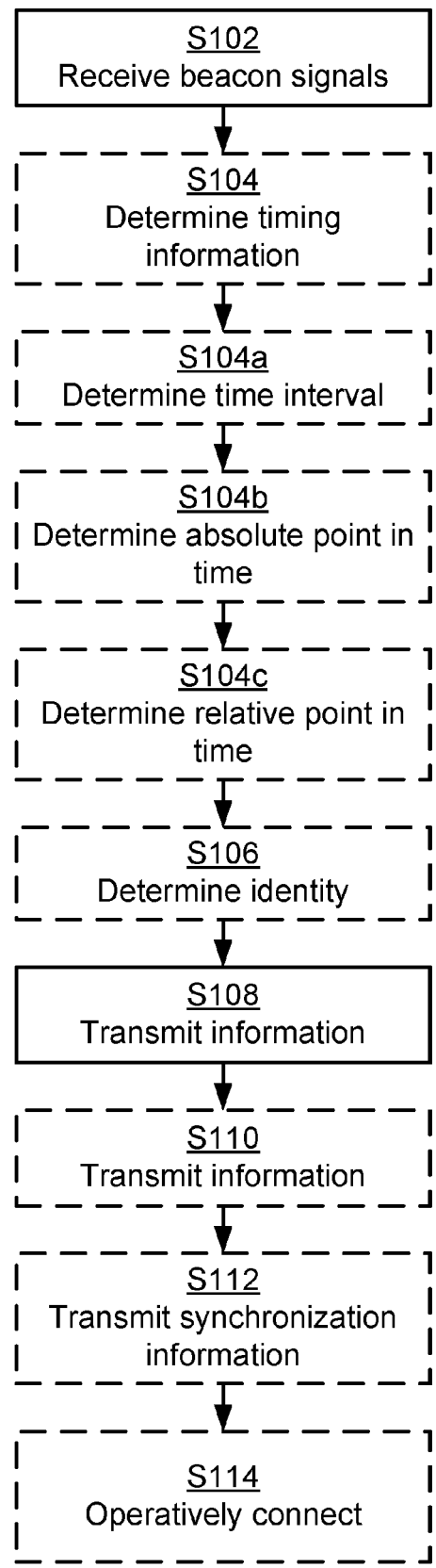
Fig. 5
Fig. 6

DISCOVERY IN A WIRELESS COMMUNICATIONS SYSTEM

CROSS REFERENCE TO RELATED APPLICATION

This application is a 35 U.S.C. § 371 national stage application of PCT International Application No. PCT/SE2014/050776, filed on Jun. 24, 2014, the disclosure and content of which is incorporated by reference herein in its entirety. The above-referenced PCT International Application was published in the English language as International Publication No. WO 2015/199587 A1 on Dec. 30, 2015.

TECHNICAL FIELD

Embodiments presented herein relate to wireless communications networks, and particularly to methods, a communications device, a wireless device, computer programs, and a computer program product for discovery in a wireless communications network.

BACKGROUND

In communications networks, there may be a challenge to obtain good performance and capacity for a given communications protocol, its parameters and the physical environment in which the communications network is deployed.

For example, various short-range radio technologies, such as Bluetooth and IEEE 802.15.4, operate in two phases: a discovery phase and a communications phase. In the discovery phase the devices of the communications network sense for other devices within their radio range. If a device is sensed and a connection to that device is desired, the connection is set up using additional signaling.

In more detail, in the discovery phase a device may send periodic broadcast radio beacons and/or listens for them by sensing a communications channel. When a beacon from another device is sensed, the information in the beacon can be used to initiate the connection between the two devices.

For example, in Bluetooth Low Energy (BLE), the discovery mode is defined as a combination of two states: an advertising state and a scanning state. In the advertising state the devices send advertisement packets and in the scanning state the devices listen to the advertising of other devices by sensing the channel. The scanning may be active or passive; in active scanning the device sends scanning request to a detected device. The detected device answers by sending a scanning response. In passive scanning the device just senses the channel for advertisement packets without transmitting anything.

For example, to enable communications between two devices in BLE one of these devices needs to be in the advertising state and the other of these devices needs to be in the initiating state (thus sensing the channel for advertisement packets and sending a connection request when sensing such an advertisement packet).

In general terms, the above outlined discovery phase consumes substantial amount of power in the devices since it requires devices to send beacons and/or to listen for beacons by sensing the channel for extended periods of time. In turn, this requires having the radio parts of the devices active. This may be an issue for battery-constrained devices.

Hence, there is still a need for an improved discovery in communications networks.

SUMMARY

An object of embodiments herein is to provide efficient discovery in communications networks.

According to a first aspect there is presented a method for discovery in a wireless communications network. The method is performed by a communications device. The method comprises wirelessly receiving, using a short-range communications technology, at least one beacon signal from at least one wireless device in the wireless communications network. The method comprises wirelessly transmitting, using the short-range communications technology, information relating to the received at least one beacon signal in at least one message such as to allow for discovery of the wireless device.

Advantageously this provides efficient discovery in communications networks.

Advantageously this enables wireless devices to sleep much more than otherwise possible and therefore enables the wireless devices to save energy.

Advantageously, since the wireless devices do not need to send beacon signals as often, this may also reduce radio interference in the communication network.

According to a second aspect there is presented a communications device for discovery in a wireless communications network. The communications device comprises a processing unit. The processing unit is configured to cause the communications device to wirelessly receive, using a short-range communications technology, at least one beacon signal from at least one wireless device in the wireless communications network. The processing unit is configured to cause the communications device to wirelessly transmit, using the short-range communications technology, information relating to the received at least one beacon signal in at least one message such as to allow for discovery of the wireless device.

According to a third aspect there is presented a computer program for discovery in a wireless communications network, the computer program comprising computer program code which, when run on a processing unit of a communications device, causes the communications device to perform a method according to the first aspect.

According to a fourth aspect there is presented a method for discovery in a wireless communications network. The method is performed by a wireless device. The method comprises wirelessly receiving, using a short-range communications technology, at least one message from a communications device, such as to allow for discovery of a wireless device. The at least one message comprises information relating to at least one beacon signal of at least the wireless device as received by the communications device. The method comprises initiating, using the short-range communications technology, a connection to the wireless device in the wireless communications network based on the received information.

According to a fifth aspect there is presented a wireless device for discovery in a wireless communications network. The wireless device comprises a processing unit. The processing unit is configured to cause the wireless device to wirelessly receive, using a short-range communications technology, at least one message from a communications device, such as to allow for discovery of a wireless device. The at least one message comprises information relating to at least one beacon signal of at least the wireless device as received by the communications device. The processing unit is configured to cause the wireless device to initiate, using the short-range communications technology, a connection to the wireless device in the wireless communications network based on the received information.

According to a sixth aspect there is presented a computer program for discovery in a wireless communications network, the computer program comprising computer program code which, when run on a processing unit of a wireless device, causes the wireless device to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional units of a communications device according to an embodiment;

FIG. 2b is a schematic diagram showing functional modules of a communications device according to an embodiment;

FIG. 3a is a schematic diagram showing functional units of a wireless device according to an embodiment;

FIG. 3b is a schematic diagram showing functional modules of a wireless device according to an embodiment;

FIGS. 5, 6, 7, and 8 are flowcharts of methods according to embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1A:
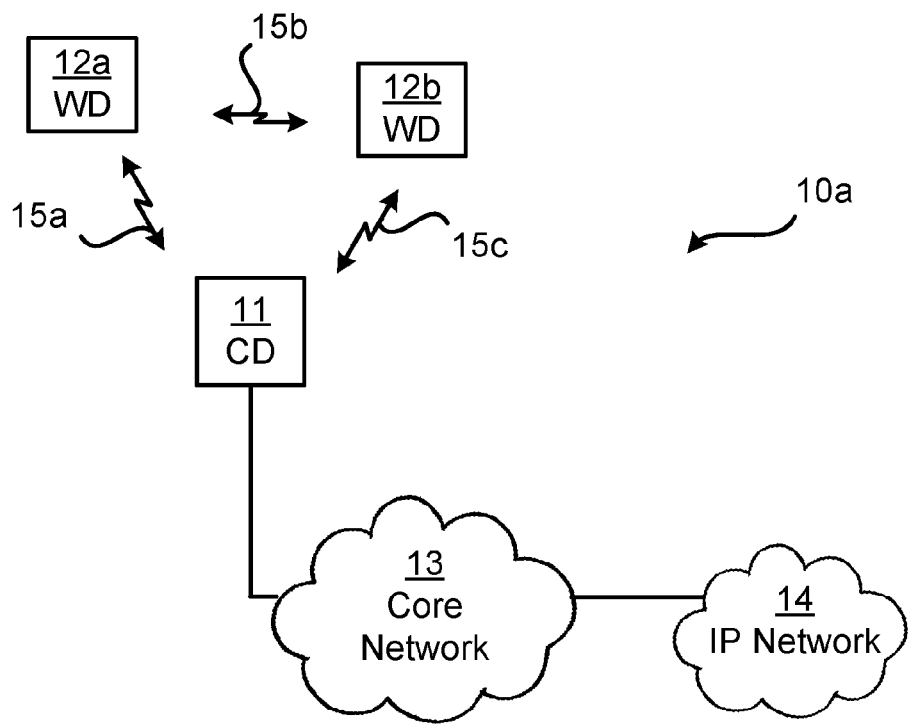
FIGS. 1a and 1b are schematic diagrams illustrating a communication network according to embodiments.

FIG. 1a is a schematic diagram illustrating a communications network 10a where embodiments presented herein can be applied. The wireless communications network 10a may be a wireless local area network (WLAN). The communications network 10a comprises a communications device (CD) 11 in the form of a network node. The network node may be provided as a base transceiver station (BTS), a Node B, an Evolved Node B, or an access point, such as an access point for Wi-Fi. Alternatively the network node may be provided as a Bluetooth low energy (BLE) gateway node, an IEEE 802.15.4 gateway node or as another short-range communications technology gateway node. The communications device 11 in FIG. 1a may be configured to provide network coverage, or access, to wireless devices (WD) 12a, 12b. The wireless device 12a, 12b may be hand-held wireless transceiver devices, such as any combination of mobile phones, smartphones, tablet computers, laptop computers or the like, or other type of user equipment (UE) or Wi-Fi devices, sensors, actuators, or other control equipment. The communications device 11 may thus act as a radio base station for the wireless devices 12a, 12b.

The communications device 11 and the wireless devices 12a, 12b are configured to be operatively connected via a wireless link 15a, 15c using a short-range communications technology interface. Examples of such short-range communications technology interfaces include, but are not limited to, Bluetooth, Bluetooth Low Energy (BLE), IEEE 802.15.4, ZigBee, WiFi, an IrDA, Z-wave, and ANT interface. Further, a first wireless device 12a and a second wireless device 12b are configured to be operatively connected via a wireless link 15b using the short-range communications technology interface.

The communications network 10a further comprises a core network 13. The communications device 11 may be operatively connected to the core network 13. The core network 13 is in turn operatively connected to an Internet Protocol (IP) based service network 14. The wireless devices 12a, 12b may thereby be enabled to access content and services as provided by the IP based service network 14 via the wireless links 15a, 15c.

Figure 1B:
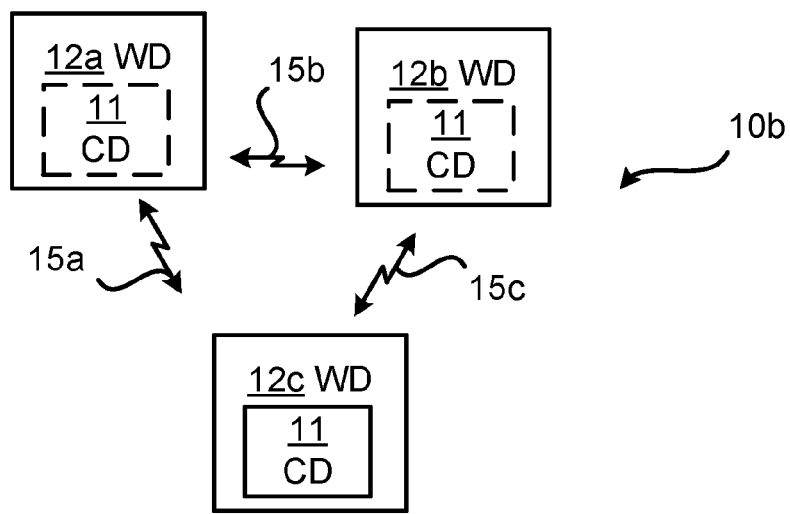

FIG. 1b is a schematic diagram illustrating a communications network 10b where embodiments presented herein can be applied. The wireless communications network 10b may be a wireless local area network (WLAN). The communications network 10b comprises a first wireless device 12a, a second wireless device 12b, and a third wireless device 12c configured to be operatively connected via wireless links 15a, 15b, 15c using a short-range communications technology interface as disclosed above. At least one of the wireless device 12a, 12b, 12c comprises a communications device 11.

Further features and properties of the wireless devices 12a, 12b, 12c and the communications device as well as their related functionality will be disclosed below.

The embodiments disclosed herein relate to discovery in a wireless communications network 10a, 10b. In order to obtain such discovery there is provided a communications device, a method performed by the communications device, a computer program comprising code, for example in the form of a computer program product, that when run on a processing unit of the communications device, causes the communications device to perform the method. In order to obtain such discovery there is further provided a wireless device, a method performed by the wireless device, a computer program comprising code, for example in the form of a computer program product, that when run on a processing unit of the wireless device, causes the wireless device to perform the method.

FIG. 2a schematically illustrates, in terms of a number of functional units, the components of a communications device 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The communications device 11 may further comprise a communications interface 22 for communications with the core network 11 and with at least one wireless device 12a, 12b. As such the communications interface 22 may comprise one or more transmitters and receivers forming a short-range communications technology interface, optionally comprising a suitable number of antennas for radio communications, and a suitable number of wired ports for wired communications with the core network 13. The short-range communications technology interface may be any combination of a Bluetooth interface, a Bluetooth Low Energy (BLE) interface, an IEEE 802.15.4 interface, a ZigBee interface, a WiFi interface, an IrDA interface, a Z-wave interface, and an ANT interface. The processing unit 21 controls the general operation of the communications device 11 e.g. by sending data and control signals to the communications interface 22 and the storage medium 23, by receiving data and reports from the communications interface 22, and by retrieving data and instructions from the storage medium 23. Other components, as well as the related functionality, of the communications device 11 are omitted in order not to obscure the concepts presented herein.

FIG. 2b schematically illustrates, in terms of a number of functional modules, the components of a communications device 11 according to an embodiment. The communications device 11 of FIG. 2b comprises a number of functional modules, such as a send and/or receive module 31a. The communications device 11 of FIG. 2b may further comprises a number of optional functional modules, such as any of a determine module 21b, and/or a connect module 21c. The functionality of each functional module 21a-c will be further disclosed below in the context of which the functional modules 21a-c may be used. In general terms, each functional module 21a-c may be implemented in hardware or in software. The processing unit 21 of the communications device 11 may thus be arranged to from the storage medium 23 fetch instructions as provided by a functional 21a-c and to execute these instructions, thereby performing any steps as will be disclosed hereinafter.

The communications device 11 may be provided as a standalone device or as a part of a further device. For example, the communications device 11 may be provided in a wireless device 12c, as in FIG. 1b. For example, the communications device 11 may be provided in a network node, as in FIG. 1a, such as a Bluetooth low energy (BLE) gateway node, or an IEEE 802.15.4 gateway node. The communications device 11 may be provided as an integral part of the wireless device 12c or the gateway node. That is, the components of the communications device 11 may be integrated with other components of the wireless device 12c or the gateway node; some components of the wireless device 12c or the gateway node and the communications device 11 may be shared. For example, if the wireless device 12c or the gateway node as such comprises a processing unit, this processing unit may be arranged to perform the actions of the processing unit 21 of the communications device 11. Alternatively the communications device 11 may be provided as a separate unit in the wireless device 12c or the gateway node.

FIG. 3a schematically illustrates, in terms of a number of functional units, the components of a wireless device 12a, 12b according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The wireless device 12a, 12b may further comprise a communications interface 32 for communications with at least one other wireless device 12a, 12b, 12c and with a communications device 11. As such the communications interface 32 may comprise one or more transmitters and receivers, comprising analogue and digital components forming a short-range communications technology interface and optionally comprising a suitable number of antennas for radio communications. The short-range communications technology interface may be any combination of a Bluetooth interface, a Bluetooth Low Energy (BLE) interface, an IEEE 802.15.4 interface, a ZigBee interface, a WiFi interface, an IrDA interface, a Z-wave interface, and an ANT interface. The processing unit 31 controls the general operation of the wireless device 12a, 12b e.g. by sending data and control signals to the communications interface 22 and the storage medium 33, by receiving data and reports from the communications interface 32, and by retrieving data and instructions from the storage medium 33. Other components, as well as the related functionality, of the wireless device 12a, 12b are omitted in order not to obscure the concepts presented herein.

FIG. 3b schematically illustrates, in terms of a number of functional modules, the components of a wireless device 12a, 12b according to an embodiment. The wireless device 12a, 12b of FIG. 3b comprises a number of functional modules; a send and/or receive module 31a, and a connect module 31b. The wireless device 12a, 12b of FIG. 3b may further comprises a number of optional functional modules, such as any of a sleep module 31c, and a sense module 31d. The functionality of each functional module 31a-d will be further disclosed below in the context of which the functional modules 31a-d may be used. In general terms, each functional module 31a-d may be implemented in hardware or in software. The processing unit 31 of the wireless device 12a, 12b may thus be arranged to from the storage medium 33 fetch instructions as provided by a functional module 31a-d and to execute these instructions, thereby performing any steps as will be disclosed hereinafter.

Figure 4:
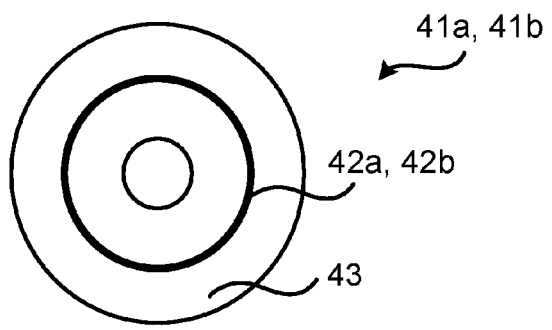
FIG. 4 shows one example of a computer program product comprising computer readable means according to an embodiment.
Figure 7:
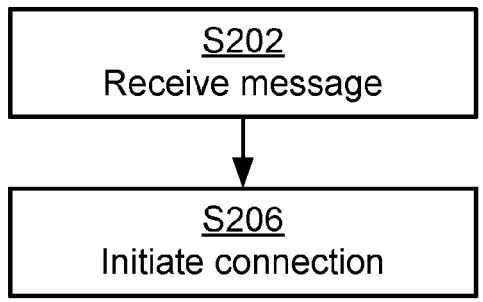
Figure 8:
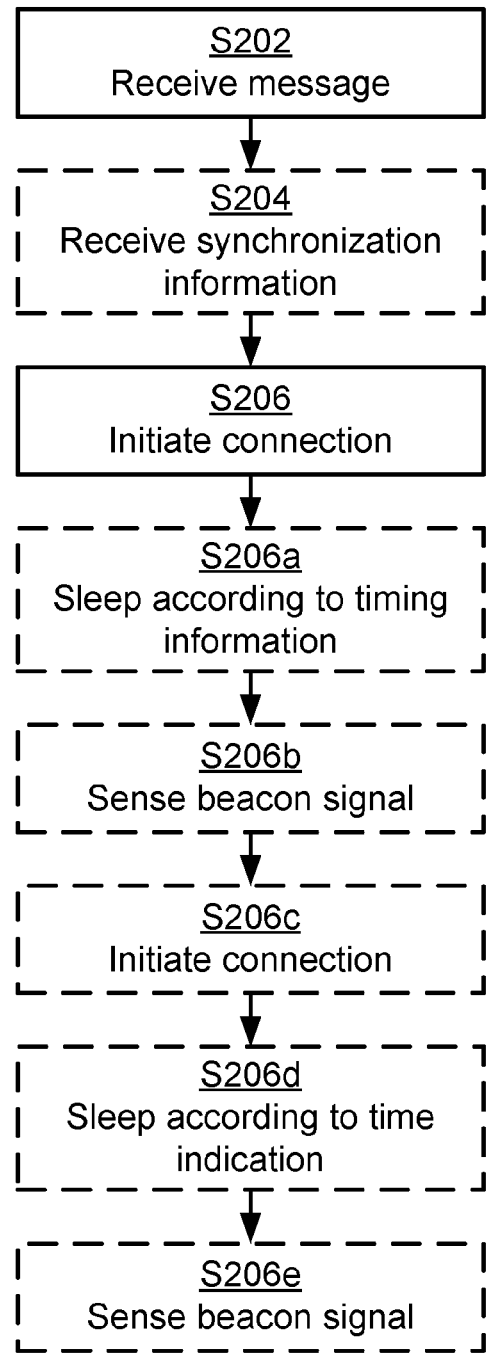

FIGS. 5 and 6 are flow chart illustrating embodiments of methods for discovery in a wireless communications network 10a, 10b as performed by the communications device 11. FIGS. 7 and 8 are flow chart illustrating embodiments of methods for discovery in a wireless communications network 10a, 10b as performed by the wireless device 12a. The methods are advantageously provided as computer programs 42a, 42b. FIG. 4 shows one example of a computer program product 41a, 41b comprising computer readable means 43. On this computer readable means 43, a computer program 42a can be stored, which computer program 42a can cause the processing unit 21 of the communications device 11 and thereto operatively coupled entities and devices, such as the communications interface 22 and the storage medium 23, to execute methods according to embodiments described herein. On this computer readable means 43, a computer program 42b can be stored, which computer program 42b can cause the processing unit 31 of the wireless device 12a and thereto operatively coupled entities and devices, such as the communications interface 32 and the storage medium 33, to execute methods according to embodiments described herein. The computer program 42a, 42b and/or computer program product 41a, 41b may thus provide means for performing any steps as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory, or a Flash memory. Thus, while the computer programs 42a, 42b are here schematically shown as a track on the depicted optical disk, the computer programs 42a, 42b can be stored in any way which is suitable for the computer program product 41a, 41b.

Reference is now made to FIG. 5 illustrating a method for discovery in a wireless communications network 10a, 10b as performed by a communications device 11 according to an embodiment.

In general terms, the communications device 11 may be less power-constrained than the wireless devices 12a, 12b and may therefore be configured to communicate more frequently than the wireless devices 12a, 12b in order to aid the discovery process of the wireless devices 12a, 12b. Particularly, the communications device 11 is configured to, in a step S102, wirelessly receive at least one beacon signal. The processing unit 21 may be configured to perform step S102, for example by implementing functionality of the functional module 21a. The at least one beacon signal is received from at least one wireless device 12b in the wireless communications network 10a, 10b. The at least one beacon signal is received using a short-range communications technology. Examples of the short-range communications technology have been provided above. The communications device 11 may thus be configured to listen to and to collect the beacons sent by wireless devices 12a, 12b within the range of the short-range communications technology of the communications device 11.

The communications device 11 is configured to, in a step S108, wirelessly transmit information relating to the received at least one beacon signal. The processing unit 21 may be configured to perform step S108, for example by implementing functionality of the functional module 21a. The information is transmitted in at least one message. This allows for discovery of the wireless device. The information is transmitted using the short-range communications technology. Depending on the mode of operation, the communications device 11 can use the information from the beacons in different ways when transmitting the at least one message. For example, the at least one message may be one of at least one broadcast message, at least one unicast message, or at least one multicast message. Embodiments related to further aspects of the mode of operation of the communications device 11 and how it may transmitted the at least one message and what information may be included in the at least one message will be provided below.

Embodiments relating to further details of discovery in a wireless communications network 10a, 10b will now be disclosed. Reference is made to FIG. 6 illustrating methods for discovery in a wireless communications network 10a, 10b as performed by a communications device 11 according to further embodiments.

As disclosed above, the communications device 11 may be implemented in a network node, such as a gateway node. The gateway node may operatively connect the wireless device 12a, 12b to Internet or another other wide area network. Particularly, the communications device 11 may be configured to, in an optional step S114, operatively connect at least one wireless device 12a, 12b in the wireless communications network to a network service. The processing unit 21 may be configured to perform step S114, for example by implementing functionality of the functional module 21c. For example, in BLE the communications device 11 may be implemented in an independent network node in the wireless communications network 10a, 10b using a BLE radio interface and link layer mechanisms for advertising, scanning and communication with the additional functionality defined below. Alternatively, the communications device 11 may be implemented in a BLE gateway node providing this functionality.

Three general embodiments relating to discovery in a wireless communications network 10a, 10b as performed by a communications device 11 will now be described in turn.

According to a first general embodiment the communications device 11 is configured to collect timing and interval of the beacons sent by various wireless devices 12a, 12b along with the device/network names. Particularly, the communications device 11 may be configured to, in an optional step S104 determine timing information relating to the received at least one beacon signal. The processing unit 21 may be configured to perform step S104, for example by implementing functionality of the functional module 21b. The communications device 11 may further be configured to, in an optional step S106 determine an identity associated with the at least one wireless device based on the received at least one beacon signal. The processing unit 21 may be configured to perform step S106, for example by implementing functionality of the functional module 21b.

In more detail, the communications device 11 may be configured to advertise the network name-timing pairs in broadcast messages so that the wireless devices 12a, 12b may obtain the information relating to when a certain wireless device 12a, 12b sends its beacon signal.

Determining timing information as in step S104 may comprise the communications device 11 to be configured to, in an optional step S104a determine a time interval between reception of two beacon signals of the at least two beacon signals in case at least two beacon signals are received. The processing unit 21 may be configured to perform step S104a, for example by implementing functionality of the functional module 21b. Determining timing information as in step S104 may comprise the communications device 11 to be configured to, in an optional step S104b determine an absolute point in time for reception of at least one of the received at least one beacon signal. The processing unit 21 may be configured to perform step S104b, for example by implementing functionality of the functional module 21*b*. Determining timing information as in step S104 may comprise the communications device 11 to be configured to, in an optional step S104*c* determine a relative point in time for reception of at least one of the received at least one beacon signal. The processing unit 21 may be configured to perform step S104*c*, for example by implementing functionality of the functional module 21*b*.

A wireless device 12*a*, 12*b* needs to hear just one such advertisement from the communications device 11 and based on the contained information (such as a name-timing pair) it may sleep until the time the wireless device 12*a*, 12*b* should be able to sense a beacon signal from another wireless device 12*a*, 12*b*.

The identity may be a network identity or a device identity. Hence, the at least one message may comprise the timing information and the identity. Particularly, the at least one message may comprises pairs of at least one of the time interval, the absolute point in time and the relative point in time, and at least one of the network identity and the device identity.

For example, in BLE the communications device 11 would, according to this first general embodiment, be configured to collect the advertisement packets of wireless devices 12*a*, 12*b* in an advertisement state within radio coverage. Advertisement packets would then be sent by the communications device 11, for example using at least one of the three BLE advertisement channels.

According to a second general embodiment the communications device 11 is configured to start the discovery in the wireless communications network 10*a*, 10*b* by collecting all beacon signals from the wireless devices 12*a*, 12*b*. Particularly, the at least one message may comprise one of the received at least one beacon signal.

The advertisement packets of the wireless devices 12*a*, 12*b* may then be simply re-transmitted as such by the communications device 11, but optionally more frequently compared to the original transmission of the wireless devices 12*a*, 12*b*. Particularly, at least two beacon signals may be received. The at least two beacon signals may be received with a first frequency of occurrence. At least two of the at least one message may then be transmitted at a second frequency of occurrence higher than the first frequency of occurrence.

However, this may result in that the wireless device 12*a*, 12*b* is trying to answer to the advertisement while the other wireless device 12*a*, 12*b* intended as the recipient of the answer may still be sleeping. Unless the communications device 11 has additional logic, this would fail. However, as long as the wireless device 12*a*, 12*b* that sensed the re-transmitted beacon signals from the communications device 11 delays its re-transmission of the answer until the other wireless device 12*a*, 12*b* wakes up, this would not be an issue.

As an extension to the second overall embodiment, the communications device 11 may, as in the first overall embodiment, add timing information and/or identity information to the beacon signals to be re-transmitted so that other wireless devices 12*a*, 12*b* would know when (and how, since it's a full advertisement) to answer. For instance, the communications device 11 may re-transmit an advertisement with an offset or absolute time to previous or subsequent actual advertisement from the wireless device 12*a*, 12*b*.

As a further extension to the second overall embodiment, the communications device 11 may combine all collected beacon signals into a single message, hence saving radio resources due to smaller amount of transmitted messages. Particularly, when at least two beacon signals are received, the at least one message may comprise at least two of the received at least two beacon signals.

One further extension to the second overall embodiment is for the communications device 11 to be configured to use active scanning, and thereby to scan requests and responses from the wireless devices 12*a*, 12*b* so as to coordinate the re-transmission of the advertisement packets. For example, the communications device 11 may command the wireless device 12*a*, 12*b* to use passive scanning for possible connection requests and not to send any advertisements (which, according to the second overall embodiment, the communications device 11 would take care of). Particularly, the communications device 11 may be configured to, in an optional step S110, wirelessly transmit information in at least one further message ordering wireless devices 12*a*, 12*b* in the wireless communications network 10*a*, 10*b* only to perform passive network scanning. The processing unit 21 may be configured to perform step S110, for example by implementing functionality of the functional module 21*a*. This information may be transmitted using the short-range communications technology.

For example, in BLE the communications device 11 would, according to this first general embodiment, be configured to in an advertisement state collect the advertisements packets of wireless devices 12*a*, 12*b* within radio coverage. After this the communications device 11 could re-transmit these advertisement packets using the originator address.

According to a third general embodiment the communications device 11 is configured to pre-select a certain time, time windows, or time interval for synchronization. This value may then by the communications device 11 be advertised with a high frequency of occurrence (i.e. often).

The communications device 11 may be configured to, in an optional step S112, wirelessly transmit synchronization information in at least one further message using the short-range communications technology. The processing unit 21 may be configured to perform step S112, for example by implementing functionality of the functional module 21*a*. In more detail, according to the third general embodiment the communications device 11 may transmit a small message with single field comprising the time (e.g., in seconds, microseconds, or milliseconds) until the next advertisement window. When a wireless device 12*a*, 12*b* senses this message, the wireless device 12*a*, 12*b* may sleep until the advertisement time and then perform a standard discovery procedure. Alternatively the communications device 11 may advertise an absolute time reference (such as UTC or GPS time) indicating the start of the next advertisement window. Hence, each further message may comprise a time indication for a next transmission window for wireless devices 12*a*, 12*b* in the wireless communications network 10*a*, 10*b*.

Alternatively, the communications device 11 may be configured to divide the wireless devices 12*a*, 12*b* into groups and select separate advertisement times for different groups. The times for different groups may then be advertised and based on this information the wireless devices 12*a*, 12*b* may take a decision when to sense the beacon signals of the other wireless devices 12*a*, 12*b*. Particularly, each further message may comprise time indications for respective next transmission windows for at least two groups of wireless devices 12*a*, 12*b* in the wireless communications network 10*a*, 10*b*. Further, each further message may comprise an absolute time reference for a next transmission window for wireless devices 12a, 12b in the wireless 3o communications network 10a, 10b.

Reference is now made to FIG. 7 illustrating a method for discovery in a wireless communications network 10a, 10b as performed by a wireless device 12a according to an embodiment.

As disclosed above, the communications device 11 is configured to wirelessly transmit information in step S108 to allow for discovery of wireless devices 12a, 12b in the wireless communications network 10a, 10b. This information is received by the wireless device 12a. Particularly, the wireless device 12a is configured to, in a step S202 wirelessly receive at least one message from a communications device 11. The processing unit 31 may be configured to perform step S202, for example by implementing functionality of the functional module 31a. The at least one message allows for discovery of a wireless device 12b. The at least one message comprises information related to at least one beacon signal of at least the wireless device 12 as received by the communications device. The at least one message is by the wireless device received using a short-range communications technology. Examples of such short-range communications technologies have been provided above.

The received information is used by the wireless device 12a during its subsequent discovery. Particularly, the wireless device 12a is configured to, in a step S206 initiate a connection to the wireless device 12b in the wireless communications network 10a, 10b based on the received information. The processing unit 31 may be configured to perform step S206, for example by implementing functionality of the functional module 31b. The connection is initiated using the short-range communications technology.

The wireless devices 12a may thus listen to the messages sent by the communications device 11 (which, as disclosed above with reference to the three overall embodiments, may be different). The wireless device 12a may then save power as it does not need to sense the channel to listen to all of the beacon signals of other wireless devices 12b all the time, but instead use the information conveyed via the message or messages of the communications device 11 when the wireless device 12a wants to initiate communications with another wireless device 12b.

Reference is now made to FIG. 8 illustrating methods for discovery in a wireless communications network 10a, 10b as performed by a wireless device 12a according to further embodiments.

As in the above disclosed first overall embodiment the at least one message may comprise timing information about the beacon signals and identity associated with at least one further wireless device 12b. The wireless device 12a may then be configured to initiate the connection by, in an optional step S206a, sleeping in accordance with the timing information; and thereafter, in an optional step S206b, sensing a beacon signal from the at least one further wireless device 12b. The processing unit 31 may be configured to perform step S206a, for example by implementing functionality of the functional module 31c. The processing unit 31 may be configured to perform step S206b, for example by implementing functionality of the functional module 31d.

As in the above disclosed second overall embodiment, the at least one message may comprise at least one beacon signal received by the communications device 11. The at least one beacon signal may be associated with at least one further wireless device 12b. The wireless device 12a may then be configured to, in an optional step S206c, initiate the connection with one of the at least one further wireless device 12b. The processing unit 31 may be configured to perform step S206c, for example by implementing functionality of the functional module 31b. This initiation may be performed without any necessary delay from when the at least one message has been received by the wireless device 12a.

As in the above disclosed third overall embodiment the wireless device 12a may be configured to, in an optional step S204 wirelessly receive synchronization information in at least one further message from the communications device 11. The processing unit 31 may be configured to perform step S204, for example by implementing functionality of the functional module 31a. For example, each further message may comprise a time indication for a next transmission window for further wireless devices 12b in the wireless communications network 10a, 10b. Then, the wireless device 12a may be configured to initiate the connection by, in an optional step S206d, sleep in accordance with the time indication; and thereafter, in an optional step S206e sense a beacon signal from at least one of the further wireless devices 12b, or sending a beacon signal to at least one of the further wireless devices 12b. The processing unit 31 may be configured to perform step S206d, for example by implementing functionality of the functional module 31c. The processing unit 31 may be configured to perform step S206e, for example by implementing functionality of the functional module 31d.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although at least some of the herein disclosed embodiments relate to discovery in a wireless communications network 10a, 10b as performed by a communications device 11 and a wireless device 12a, the herein disclosed functionality of the communications device 11 may be implemented in a wireless device 12c, as in FIG. 1b. For example, the functionality of the communications device 11 may be distributed among the wireless devices 12a, 12b, 12c. For example, the wireless devices 12a, 12b, 12c may take turns acting as the communications device 11. Although requiring a higher power consumption when acting as a communications device 11, this may still enable the wireless devices 12a, 12b, 12c to reduce their overall power consumption and also the overall interference in the communications network 10a, 10b to be reduced. Hence, each wireless device 12a, 12b, 12c may be configured to transmit a message requesting another wireless device 12a, 12b, 12c implementing the functionality of the communications device 11 to act as the communications device 11. Whether or not to act as a communications device 11 for the wireless device 12a, 12b, 12c may depend on properties of the wireless device 12a, 12b, 12c, such as its power consumption.

The invention claimed is:

1. A method for discovery in a wireless communications network, the method being performed by a communications device, the method comprising the steps of:
   wirelessly receiving by the communications device, using a short-range communications technology, at least one beacon signal from at least one wireless device in the wireless communications network;
   determining timing information relating to the received at least one beacon signal;
   determining an identity comprising at least one of a network identity and a device identity associated with the at least one wireless device based on the received at least one beacon signal; and wirelessly transmitting by the communications device, using the short-range communications technology, information relating to the received at least one beacon signal in at least one message to allow for discovery of the at least one wireless device by other wireless devices, wherein the at least one message comprises said timing information and said identity.

2. The method according to claim 1, wherein determining timing information comprises:

determining, in case at least two beacon signals are received, a time interval between reception of two beacon signals of the at least two beacon signals;

determining an absolute point in time for reception of at least one of the received at least one beacon signal; and/or determining a relative point in time for reception of at least one of the received at least one beacon signal.

3. The method according to claim 2, wherein the at least one message comprises pairs of at least one of said time interval, said absolute point in time and said relative point in time, and at least one of said network identity and said device identity.

4. The method according to claim 1, wherein the at least one message comprises one of the received at least one beacon signal.

5. The method according to claim 1, wherein at least two beacon signals are received, and wherein the at least one message comprises at least two of the received at least two beacon signals.

6. The method according to claim 1, wherein at least two beacon signals are received, and wherein the at least two beacon signals are received with a first frequency of occurrence, and wherein at least two of the at least one message are transmitted at a second frequency of occurrence higher than said first frequency of occurrence.

7. The method according to claim 1, further comprising:

wirelessly transmitting information in at least one further message using the short-range communications technology ordering wireless devices in the wireless communications network only to perform passive network scanning.

8. The method according to claim 1, further comprising:

wirelessly transmitting synchronization information in at least one further message using the short-range communications technology.

9. The method according to claim 8, wherein each further message comprises a time indication for a next transmission window for wireless devices in the wireless communications network.

10. The method according to claim 8, wherein each further message comprises time indications for respective next transmission windows for at least two groups of wireless devices in the wireless communications network.

11. The method according to claim 8, wherein each further message comprises an absolute time reference for a next transmission window for wireless devices in the wireless communications network.

12. The method according to claim 1, wherein the short-range communications technology is one of Bluetooth, Bluetooth Low Energy, IEEE 802.15.4, ZigBee, WiFi, IrDA, Z-wave, and ANT.

13. The method according to claim 1, wherein the wireless communications network is a wireless local area network (WLAN).

14. The method according to claim 1, wherein the message is one of a broadcast message, a unicast message, and a multicast message.

15. The method according to claim 1, further comprising:

operatively connecting at least one wireless device in the wireless communications network to a network service.

16. A method for discovery in a wireless communications network, the method being performed by a first wireless device, the method comprising the steps of:

wirelessly receiving at the first wireless device, using a short-range communications technology, at least one message from a communications device, to allow for discovery of a second wireless device, the at least one message comprising information relating to at least one beacon signal of at least the second wireless device as previously received by the communications device from the at least the second wireless device, wherein the at least one message comprises timing information about the at least one beacon signal and an identity comprising at least one of a network identity and a device identity associated with the at least the second wireless device; and initiating at the first wireless device, using the short-range communications technology, a connection to the second wireless device in the wireless communications network based on the received information from the communications device, wherein initiating said connection comprises:

sleeping in accordance with the timing information; and
thereafter: sensing a beacon signal from the second wireless device.

17. The method according to claim 16, wherein said at least one message comprises at least one beacon signal received by the communications device, the at least one beacon signal being associated with at least one further wireless device.

18. The method according to claim 17, wherein initiating said connection phase comprises:

initiating the connection with one of the at least one further wireless device.

19. The method according to claim 16, further comprising:

wirelessly receiving synchronization information in at least one further message from the communications device.

20. The method according to claim 19, wherein each further message comprises a time indication for a next transmission window for further wireless devices in the wireless communications network.

21. The method according to claim 20, wherein initiating said connection phase comprises:

sleeping in accordance with the time indication; and
thereafter sensing a beacon signal from at least one of the further wireless devices, or sending a beacon signal to at least one of the further wireless devices.

22. A communications device comprising a processing unit, the processing unit being configured to cause the communications device to:

wirelessly receive by the communications device, using a short-range communications technology, at least one beacon signal from at least one wireless device in the wireless communications network;

determine timing information relating to the received at least one beacon signal;

determine an identity comprising at least one of a network identity and a device identity associated with the at least one wireless device based on the received at least one beacon signal; and wirelessly transmit by the communications device, using the short-range communications technology, information relating to the received at least one beacon signal in at least one message to allow for discovery of the at least one wireless device by other wireless devices, wherein the at least one message comprises said timing information and said identity.

23. The communications device according to claim 22, wherein the communications device is part of a gateway node, such as a Bluetooth low energy, BLE, or an IEEE 802.15.4 gateway node.

24. The communications device according to claim 22, wherein the communications device is part of a wireless device.

25. A wireless device comprising a processing unit configured to cause the wireless device to:

wirelessly receive by the wireless device, using a short-range communications technology, at least one message from a communications device, to allow for discovery of a second wireless device, the at least one message comprising information relating to at least one beacon signal of at least the second wireless device as previously received by the communications device from the at least the second wireless device, wherein said at least one message comprises timing information about the at least one beacon signal and an identity comprising at least one of a network identity and a device identity associated with the at least the second wireless device; and initiate by the wireless device, using the short-range communications technology, a connection to the second wireless device in the wireless communications network based on the received information from the communications device by sleeping in accordance with the timing information and thereafter sensing a beacon signal from the second wireless device.

26. A computer program product for discovery in a wireless communications network, the computer program product comprising a non-transitory computer readable storage medium storing computer code which, when run on a processing unit of a communications device, causes the processing unit to cause the communications device to:

wirelessly receive by the communications device, using a short-range communications technology, at least one beacon signal from at least one wireless device in the wireless communications network;

determine timing information relating to the received at least one beacon signal;

determine an identity comprising at least one of a network identity and a device identity associated with the at least one wireless device based on the received at least one beacon signal; and wirelessly transmit by the communications device, using the short-range communications technology, information relating to the received at least one beacon signal in at least one message to allow for discovery of the at least one wireless device by other wireless device, wherein the at least one message comprises said timing information and said identity.

27. A computer program product for discovery in a wireless communications network, the computer program product comprising a non-transitory computer readable storage medium storing computer code which, when run on a processing unit of a wireless device, causes the processing unit to cause the wireless device to:

wirelessly receive by the wireless device, using a short-range communications technology, at least one message from a communications device, to allow for discovery of a second wireless device, the at least one message comprising information relating to at least one beacon signal of at least the second wireless device as previously received by the communications device from the at least the second wireless device, wherein the at least one message comprises timing information about the at least one beacon signal and an identity comprising at least one of a network identity and a device identity associated with the at least the second wireless device; and initiate by the wireless device, using the short-range communications technology, a connection to the second wireless device in the wireless communications network based on the received information from the communications device by sleeping in accordance with the timing information and thereafter sensing a beacon signal from the second wireless device.

* * * * *